Oct. 14, 1941.  M. TRESHOW  2,258,664
ROTARY KILN
Filed June 11, 1940  2 Sheets-Sheet 1
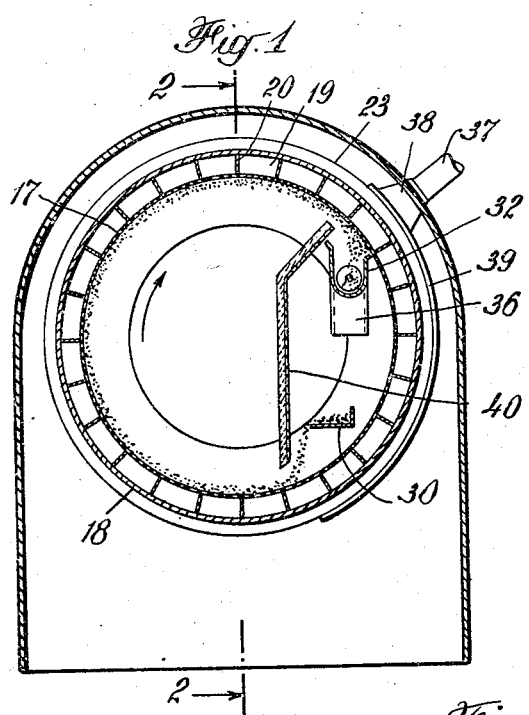
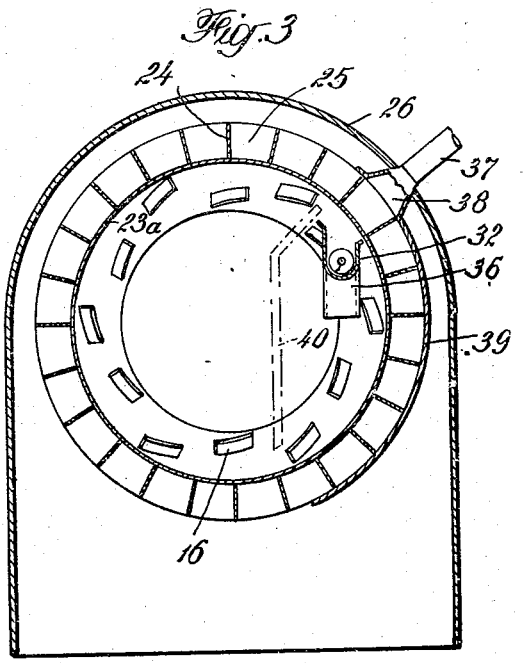
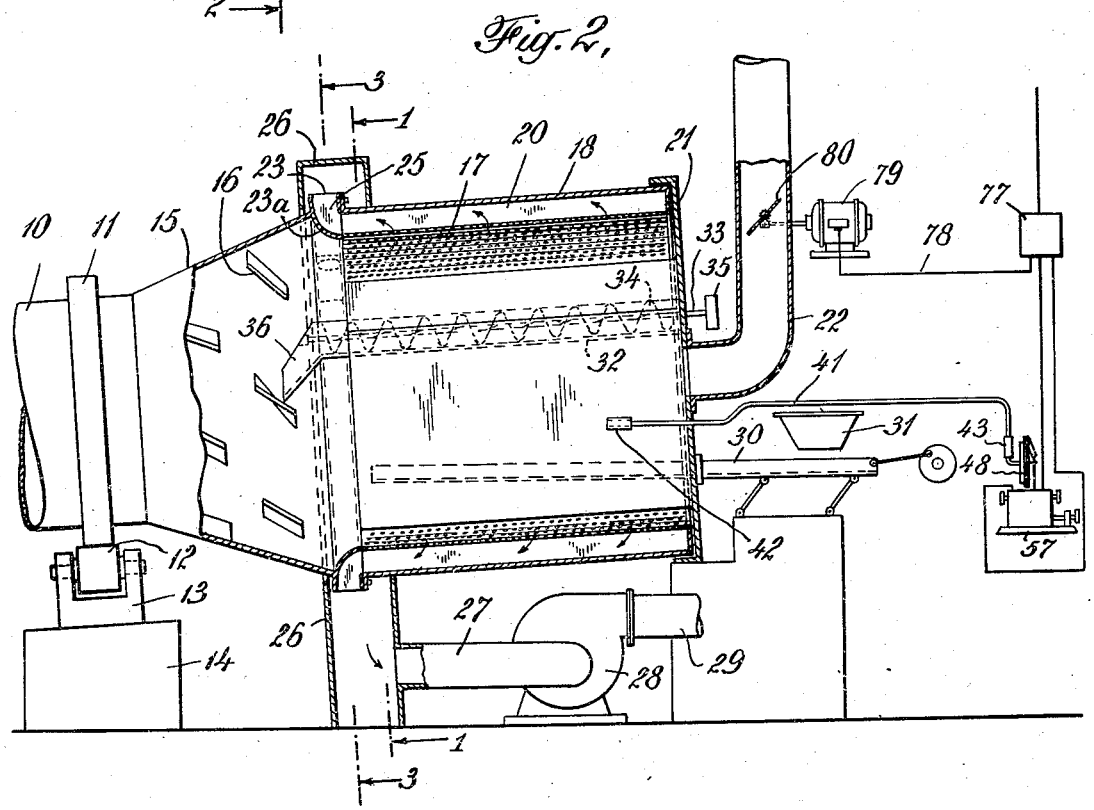
INVENTOR
Michael Treshow
BY
Pennie Davis Marvin Edmonds
ATTORNEYS Oct. 14, 1941.     M. TRESHOW     2,258,664
ROTARY KILN
Filed June 11, 1940     2 Sheets-Sheet 2

INVENTOR
Michael Treshow
BY
ATTORNEYS

Patented Oct. 14, 1941

2,258,664

UNITED STATES PATENT OFFICE 2,258,664

ROTARY KILN

Michael Treshow, Los Angeles, Calif., assignor to F. L. Smidth & Co., New York, N. Y., a corporation of New Jersey Application June 11, 1940, Serial No. 339,838

6 Claims. (Cl. 263—32)

This invention relates to the burning of materials as, for example, in the manufacture of cement, the production of lime, etc., and is concerned more particularly with a novel method and apparatus by which such materials may be burned efficiently and with excellent heat economy. The new method and apparatus may be used advantageously in the burning of materials of various kinds, but inasmuch as the principles of the invention afford special benefits in the burning of cement raw materials for the production of clinker, an embodiment of the invention suitable for that particular use will be described in detail for purposes of explanation.

In the manufacture of cement according to one process now in use, the cement raw materials reduced to appropriate fineness are preheated before being introduced into a rotary kiln where the burning into clinker is completed, and the preheating is effected by passing the hot gases of combustion from the kiln through a porous layer of the materials in moist condition. The total apparatus for practising this process may include a cylindrical grate mounted to rotate with the kiln and disposed coaxially thereof at the inlet end, and the materials are distributed in a layer on the inner surface of the grate and held in place thereon by the hot gases drawn from the kiln and through the layer. As the kiln and grate rotate, the materials in the layer are discharged from the grate at one point in their path of travel, and the preheated materials are then introduced in the kiln where the burning is completed in the usual way.

As is well known, nearly all cement raw materials contain greater or less amounts of alkalis or alkaline compounds, a portion of which are volatilized in the calcining and burning zone of the kiln and carried away with the hot gases of combustion. These alkalis or alkaline compounds condense in the form of very fine particles at temperatures lower than those prevailing in the kiln itself and when hot gases from a kiln in which cement raw materials are burned are passed through a permeable layer of the moist raw materials to preheat the latter, the exposure of the volatilized substances to the lower temperatures in the layer causes condensation of the substances. The condensed substances are then carried back into the kiln with the preheated raw materials and again passed through the calcining zone into the burning zone where they are revolatilized and again carried away.

As a result of the cycle of volatilization and condensation of the alkaline substances, an increasing concentration of the substances in the waste gases occurs and this is accompanied by an increase in the proportion of such substances in the materials passing through the kiln. As only a portion of the substances are volatilized in the kiln, the increase of such substances in the materials being burned results in an increase in the alkaline content in the clinker and after a period of operation, the amount of alkalis or alkaline compounds in the clinker may be such as to impair the quality of the finished cement. It is, therefore, important to control the concentration of alkali fumes in the waste gases, since this governs the amount of such substances present in the finished product. Also, as the concentration of the volatile materials increases, the condensation thereof in the layer undergoing preheating interferes with the flow of gases through the layer.

The present invention is, accordingly, directed to the provision of a method and apparatus by which control may be exercised over the total amount in the waste gases leaving the kiln of those substances whose presence in too great concentration either impairs the quality of the finished product from the kiln or interferes with the preheating of the materials to be burned in the kiln. In the practice of the invention, the pressure differential on the opposite sides of the layer is utilized to effect the desired control and for this purpose, the major portion of the gases leaving the kiln is caused to pass through the layer undergoing preheating, while a minor amount is conducted around the layer through a by-pass. Flow through the by-pass is then controlled by means responsive to variations in the pressure at one side of the layer and more or less of the gas stream is by-passed as conditions require. The solids contained in that portion of the gases flowing through the by-pass are thus removed from the circuit and, accordingly, control of the total amount of the solids which would otherwise circulate between the kiln and the layer being preheated is accomplished.

For a better understanding of the invention, reference may be had to the accompanying drawings in which:

Fig. 1 is a transverse sectional view on the line 1—1 of the apparatus shown in Fig. 2;

Fig. 2 is a view, partly in side elevation and partly in longitudinal section on the line 2—2 of Fig. 1 of an apparatus for practicing the method of the invention;

Fig. 3 is a sectional view on the line 3—3 of Fig. 2;

Figure 4:
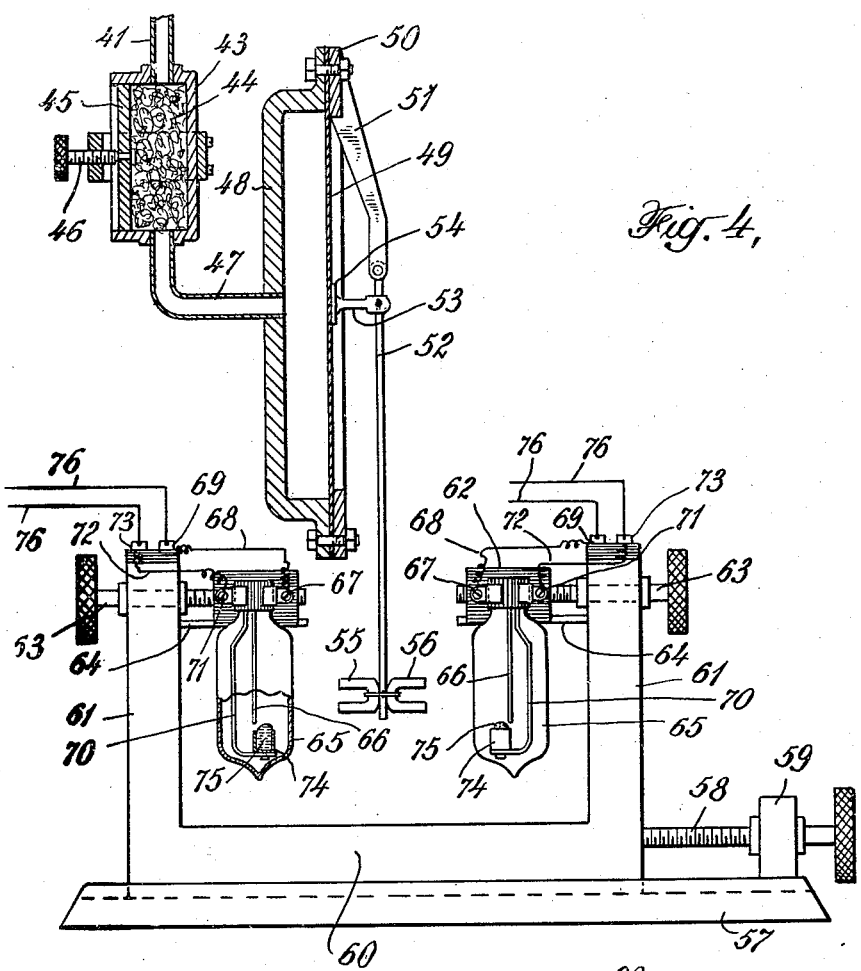
Fig. 4 is a view, partly in vertical section and partly in elevation, of a portion of the control mechanism.

Referring to the drawings, the apparatus illustrated comprises a rotary kiln 10 which may be of the usual construction and is provided with live rings 11 running on supporting rollers 12 having trunnions mounted in bearings 13 supported on a foundation 14. At its inlet end, the kiln has a conical intake section 15 within which are lifters 16 which serve to advance material upward along the lowered inclined surface of the section and into the cylindrical portion of the kiln.

Mounted to rotate with the kiln is a cylindrical grate 17 outside of which is an imperforate cylinder 18 and the space between the cylinder and grate is subdivided into passages 19 by partition members 20. The end of the grate remote from the kiln is closed by a stationary end plate 21 from which leads a duct 22. At the large end of the conical section of the kiln is an annular gas outlet 23 defined in part by a partition 23a and subdivided by partitions 24 into ports 25 aligned with the passages 19. The ports 25 open into a hood 26 which is connected by a duct 27 to the suction side of a fan 28 having an outlet duct 29 leading to a stack.

Projecting through an opening through the end plate 21 is a distributing device 30 which receives material to be burned from a hopper 31 and distributes it in a layer on the inner surface of the grate 17. Within the space inside the grate is a trough 32 containing a shaft 33 provided with screw flights 34. The shaft extends through the end plate 21 and carries a pulley 35 by which it may be rotated to cause the flights thereon to advance material deposited in the trough to a chute 36 through which the material is delivered into the conical section 15 of the kiln. The material on the grate is discharged into the trough by air blown against the outer surface of the grate and, for this purpose, air is supplied through a pipe 37 having an enlarged end 38 lying within the hood 26 and terminating close to the outer end of the outlet 23 and slightly above the trough 32. A plate 39 extends from the end 38 of the pipe along the annular outlet to a point beyond the distributor 30, and air supplied through the pipe blows the material in the layer on the inside of the grate into the trough through which it is advanced by the conveyor and discharged into the conical section 15 of the kiln. A shield 40 within the grate prevents flow of gases through the part of the grate aligned with the shield plate 39.

In the operation of the apparatus in the production of cement, the fine granular raw materials in moist condition are distributed on the inside of the grate by the distributing device 30 and preheated by the gases drawn therethrough by the fan 28. A pressure differential is maintained on opposite sides of the grate and this differential varies with the permeability of the layer on the grate. The pressure differential, accordingly, varies with the amount of fine materials which are deposited in the layer, for example, by condensation of volatilized alkaline substances.

Extending through the end plate 21 is a tube 41 having an intake fitting 42 on its inner end, this fitting being constructed to prevent solid particles of a given size from entering the line and clogging it. The line 41 leads to a throttling device 43 which consists of a chamber containing a mass 44 of cotton or similar fibrous material and provided with a wall 45 which is movable by a screw 46 to compress the fibrous mass and vary its permeability with respect to the gases. The interior of the throttling device is connected by a line 47 to the interior of the member 48, one wall of which is formed by a sensitive diaphragm 49 held taut by a ring 50 bolted to a peripheral flange on the member 48. The diaphragm is exposed on one face to the atmosphere and is drawn in or forced out from its normal position by variations in the pressure on the inside of the grate transmitted to the diaphragm through line 41, throttling device 43, and line 47. The throttling device serves to reduce the sensitivity of the diaphragm to pressure variations and its action may be controlled by compression of the fibrous mass therein by means of the movable wall 45.

A bracket 51 depends from the ring 50 and at its lower end is pivoted a lever 52 provided with an arm 43 having an enlarged end 54 contacting with the outer surfaces of the diaphragm. The lower end of the lever carries a pair of permanent magnets 55, 56 on opposite sides thereof.

Mounted on a suitable base 57 and movable therealong by means of an adjusting screw 58 threaded through a standard 59 secured to the base is a frame 60 provided with upright members 61 at either end. A plate 62 of insulating material is mounted on an adjusting screw 63 threaded through each member near its upper end and a pin 64 attached to the member engages the plate and prevents its rotation with the screw, so that the screw may be employed to move the plate toward or away from the member.

Attached to each plate 62 by any convenient means is an evacuated bulb 65 containing a plate spring 66 of magnetic material, the upper end of the spring being secured in position at the upper end of the bulb and connected electrically to a terminal 67 mounted on plate 62 and connected by a wire 68 to a terminal 69 on the end of the member 61. The bulb also encloses a rod 70 secured in position at its upper end and connected electrically to a terminal 71 on the plate which is in turn connected by a wire 72 to a terminal 73 on the member 61. At its lower end, the rod 70 carries a vessel 74 within which is a drop of mercury 75.

The terminals 69 and 73 are connected by wires 76 to suitable terminals within a control cabinet 77 through which current is supplied through a cable 78 to a motor 79 which operates a damper 80 within the duct 22. The electrical connections are such that when the lever 52 is swung to one side, one or the other of the magnets 55, 56 attracts the plate spring 66 within the adjacent bulb and causes it to touch the mercury drop 75 within the bulb. This closes a circuit through which current is supplied to the motor, and the motor operates to open or close the damper 80, depending on which of the sets of contacts in the bulb 65 are closed. Variations in the pressure within the grate are thus utilized to operate the damper to control the proportions of the gases from the kiln flowing through the grate and by-pass, respectively, and the sensitivity of the diaphragm is reduced by the throttling device so that the apparatus will not overcontrol and cause the damper 80 to be continually moved.

The mean value of the variations in the pressure within the grate is controllable by shifting the frame 60 relative to its base by means of the screw 58, and the extent of the range of variations may be controlled by the screws 63 which may be turned to vary the positions of the plate springs 66 relative to the magnets 55, 56.

Figure 5:
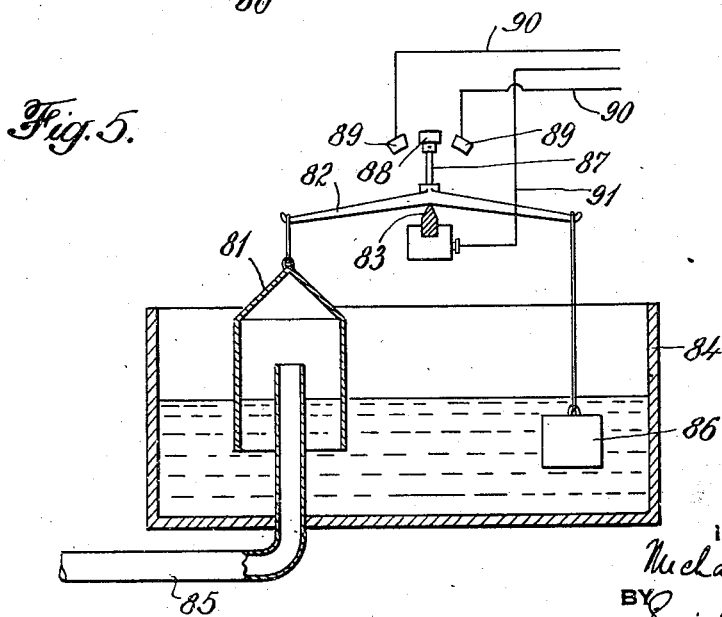
Fig. 5 is a view similar to Fig. 4 of a modified form of the control mechanism.

A modified form of control device is illustrated in Fig. 5 and it includes a gasometer bell 81 which depends from one end of a lever 82 supported on a knife edge 83, the lower open end of the bell lying beneath the level of a body of oily liquid within a vessel 84. A line 85 from a throttling device 43 leads through the bottom of the vessel into the bell above the liquid level and the bell is balanced by a plate 86 lying within the liquid and depending from the other arm of the lever 82. At its mid-point, the lever 82 is provided with an arm 87 provided with a brush 88 movable with the arm into contact with one or the other of a pair of contacts 89 connected by wires 90 to a control cabinet similar to that designated 76. The knife edge is similarly connected to the cabinet by a wire 91 and the connections are such that as the bell 81 rises or falls in response to pressure variations in the line 85, a circuit is established through one or the other of the contacts 89. The circuit thus closed causes operation of a motor similar to the motor 79 and this in turns opens or closes a damper similar to the damper 80, depending on the circuit closed by the action of the bell.

In the apparatus described, the end of the line 41 lies within the interior of the grate, and the operation of the motor is thus responsive to variations in the pressure on that side of the layer through which the gas enters the layer. If desired, the end of the line may be placed on the other side of the grate, but the construction illustrated is preferred.

The duct 22 by which the gases are by-passed around the layer may be used as an auxiliary stack when starting the kiln or serve as a vent when the fan 28 is not operating. When used for such purposes, the damper 80 is in open position. Since the position of the damper has an effect on the draft in the kiln, the motor 79 may, if desired, be utilized to operate indicators, not shown, at the ends of the kiln so that the position of the damper may be made known to the kiln operators. The damper is illustrated as lying within the stack 22, but, if desired, may be placed on its top.

I claim:

1. A method of making cement by burning a raw material mixture which gives off volatile substances at the temperature at which the material is burned, comprising burning fuel in a kiln, forming a permeable layer of the raw materials, passing part of the hot exhaust gases from the kiln through the layer to preheat the materials, by-passing the remainder of said gases around the layer, supplying the preheated materials to the kiln to be burned therein, the volatile substances passing off with the exhaust gases and that portion of the substances present in the gases passing through the layer being deposited therein, and controlling the amount of such substances deposited throughout the layer by regulating the proportions of the hot exhaust gases which are, respectively, passed through the layer and by-passed around it.

2. A method of making cement by burning a raw material mixture which gives off volatile substances at the temperature at which the material is burned, comprising burning fuel in a kiln, forming a permeable layer of the raw materials, passing part of the hot exhaust gases from the kiln through the layer to preheat the materials, by-passing the remainder of said gases around the layer, supplying the preheated materials to the kiln to be burned therein, the volatile substances passing off with the exhaust gases and that portion of the substances present in the gases passing through the layer being deposited therein, and controlling the amount of such substances deposited throughout the layer by varying the proportions of the hot exhaust gases, which are, respectively, passed through the layer and by-passed around it in accordance with variations in the pressure of the gases at one side of the layer.

3. A method of making cement by burning a raw material mixture which gives off volatile substances at the temperature at which the material is burned, comprising burning fuel in a kiln, forming a permeable layer of the raw materials, passing part of the hot exhaust gases from the kiln through the layer to preheat the materials, by-passing the remainder of said gases around the layer, supplying the preheated materials to the kiln to be burned therein, the volatile substances passing off with the exhaust gases and that portion of the substances present in the gases passing through the layer being deposited therein, and controlling the amount of such substances deposited throughout the layer by varying the proportions of the hot exhaust gases, which, are respectively, passed through the layer and by-passed around it in accordance with variations in the pressure of the gases at that side of the layer through which the gases enter the layer.

4. Apparatus for making cement by burning a raw material mixture which gives off volatile substances at the temperature at which the material is burned, which comprises a kiln in which fuel is burned, means for supporting a permeable layer of the material, means for supplying the raw material mixture to the support, means for removing the material from the support and supplying it to the kiln for burning therein, means for passing part of the hot gases of combustion from the kiln through the layer to preheat the material in the layer, said gases containing volatile substances that are deposited throughout the layer, means for by-passing the remainder of the hot gases of combustion around the layer, and means responsive to variations in the pressure at one side of the layer for regulating the relative proportions of the gases which are, respectively, passed through the layer and by-passed around it.

5. Apparatus for making cement by burning a raw material mixture which gives off volatile substances at the temperature at which the material is burned, which comprises a kiln in which fuel is burned, means for supporting a permeable layer of the material, means for supplying the raw material mixture to the support, means for removing the material from the support and supplying it to the kiln for burning therein, means for passing part of the hot gases of combustion from the kiln through the layer to preheat the material in the layer, said gases containing volatile substances that are deposited throughout the layer, means for by-passing the remainder of the hot gases of combustion around the layer, means for controlling flow through the by-pass means, and means responsive to variations in the pressure at one side of the layer for controlling the flow control means.

6. Apparatus for making cement by burning a raw material mixture which gives off volatile substances at the temperature at which the material is burned, which comprises a kiln in which fuel is burned, means for supporting a permeable layer of the material, means for supplying the raw material mixture to the support, means for removing the material from the support and supplying it to the kiln for burning therein, means for passing part of the hot gases of combustion from the kiln through the layer to preheat the material in the layer, said gases containing volatile substances that are deposited throughout the layer, means for by-passing the remainder of the hot gases of combustion around the layer, means for controlling flow through the by-pass means, and means responsive to variations in pressure at the side of the layer through which the gases enter the layer for controlling the flow control means.

MICHAEL TRESHOW.